United States Patent
Chen et al.

(10) Patent No.: US 9,202,094 B1
(45) Date of Patent: Dec. 1, 2015

(54) AIMING PATTERN SHAPE AS DISTANCE SENSOR FOR BARCODE SCANNER

(71) Applicant: SYMBOL TECHNOLOGIES, INC., Schaumburg, IL (US)

(72) Inventors: Caihua Chen, Albany, NY (US); Vladimir Gurevich, Great Neck, NY (US); Ronald A Petrozzo, Kings Park, NY (US); Miguel O Rodriguez Ortiz, Coram, NY (US); David T Shi, Setauket, NY (US)

(73) Assignee: Symbol technologies, LLC, Holtsville, NY (US)

( * ) Notice: Subject to any disclaimer, the term of this patent is extended or adjusted under 35 U.S.C. 154(b) by 0 days.

(21) Appl. No.: 14/282,658

(22) Filed: May 20, 2014

(51) Int. Cl.
G06K 7/10 (2006.01)

(52) U.S. Cl.
CPC ........ G06K 7/10831 (2013.01); G06K 7/10792 (2013.01); G06K 7/10821 (2013.01)

(58) Field of Classification Search
CPC .......... G06K 7/10; G06K 2007/10524; G06K 7/10544; G06K 7/10792; G06K 7/10801; G06K 7/10821; G06K 7/14; G06K 7/1404; G06K 7/10851; G06K 2207/1011
USPC ............................. 235/454, 462.01–462.49, 235/472.01–472.03
See application file for complete search history.

(56) References Cited

U.S. PATENT DOCUMENTS

| | | | |
|---|---|---|---|
| 6,634,558 B1 | 10/2003 | Patel | |
| 7,967,206 B2 * | 6/2011 | Lopez et al. | ....... G06K 7/10851 235/454 |
| 8,033,471 B2 | 10/2011 | Van Kerkhoven | |
| 8,910,873 B2 * | 12/2014 | Drzymala et al. | ....... 235/462.43 |
| 2005/0284942 A1 | 12/2005 | Gurevich | |
| 2007/0111761 A1 | 5/2007 | Doi | |
| 2009/0057413 A1 * | 3/2009 | Vinogradov et al. | .... 235/462.35 |
| 2011/0290885 A1 * | 12/2011 | Chen et al. | ............... 235/462.21 |
| 2011/0290886 A1 | 12/2011 | Carlson | |
| 2013/0026236 A1 | 1/2013 | Goren | |
| 2014/0008440 A1 | 1/2014 | Patil | |
| 2015/0178533 A1 * | 6/2015 | Canini et al. | .................. 235/454 |

FOREIGN PATENT DOCUMENTS

WO 2007111761 A3 8/2007

OTHER PUBLICATIONS

International Search Report and Written Opinion mailed Aug. 25, 2015 in counterpart PCT application (PCT/US2015/030571.

* cited by examiner

*Primary Examiner* — Thien M Le
*Assistant Examiner* — April Taylor
(74) *Attorney, Agent, or Firm* — Nong-Qiang Fan

(57) ABSTRACT

An imaging scanner includes an aiming light source configured to emit visible light through both the shape defining element and the aiming lens arrangement to generate an aiming pattern on a target object. The shape of the aiming pattern changes with the distance between the target object and the imaging scanner. For determining the distance, the shape of the aiming pattern in a pixel data is compared with the expected shape of aiming patterns at multiple distances.

20 Claims, 6 Drawing Sheets

AIMING PATTERN SHAPE AS DISTANCE SENSOR FOR BARCODE SCANNER

BACKGROUND

Various electro-optical systems have been developed for reading optical indicia, such as barcodes. A barcode is a coded pattern of graphical indicia comprised of a series of bars and spaces of varying widths. In a barcode, the bars and spaces have differing light reflecting characteristics. Some of the barcodes have a one-dimensional structure in which bars and spaces are spaced apart in one direction to form a row of patterns. Examples of one-dimensional barcodes include Uniform Product Code (UPC), which is typically used in retail store sales. Some of the barcodes have a two-dimensional structure in which multiple rows of bar and space patterns are vertically stacked to form a single barcode. Examples of two-dimensional barcodes include Code 49 and PDF417.

Systems that use one or more imaging sensors for reading and decoding barcodes are typically referred to as imaging-based barcode readers, imaging scanners, or imaging readers. An imaging sensor generally includes a plurality of photosensitive elements or pixels aligned in one or more arrays. Examples of imaging sensors include charged coupled devices (CCD) or complementary metal oxide semiconductor (CMOS) imaging chips.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
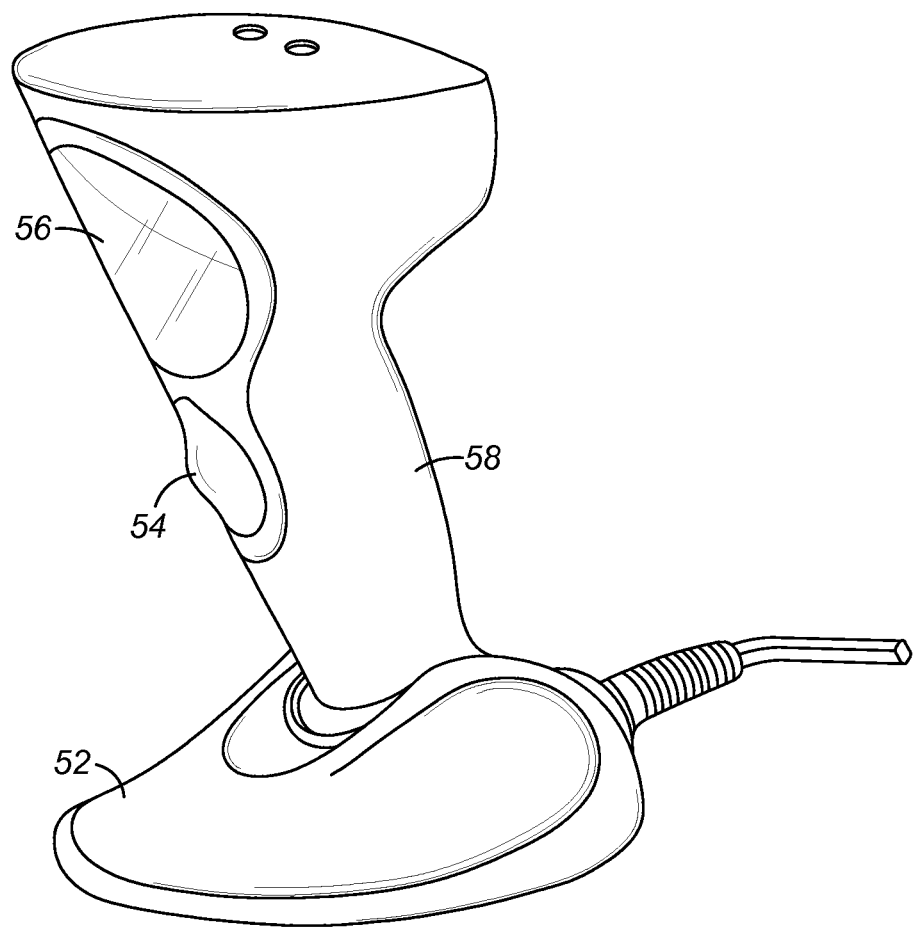
FIG. 1 shows an imaging scanner in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 shows an imaging scanner 50 in accordance with some embodiments. The imaging scanner 50 has a window 56 and a housing 58 with a handle. The imaging scanner 50 also has a base 52 for supporting itself on a countertop. The imaging scanner 50 can be used in a hands-free mode as a stationary workstation when it is placed on the countertop. The imaging scanner 50 can also be used in a handheld mode when it is picked up off the countertop and held in an operator's hand. In the hands-free mode, products can be slid, swiped past, or presented to the window 56. In the handheld mode, the imaging scanner 50 can be moved towards a barcode on a product, and a trigger 54 can be manually depressed to initiate imaging of the barcode. In some implementations, the base 52 can be omitted, and the housing 58 can also be in other shapes. In FIG. 1, a cable is also connected to the base 52. In other implementations, when the cable connected to the base 52 is omitted, the imaging scanner 50 can be powered by an on-board battery and it can communicate with a remote host by a wireless link.

Figure 2:
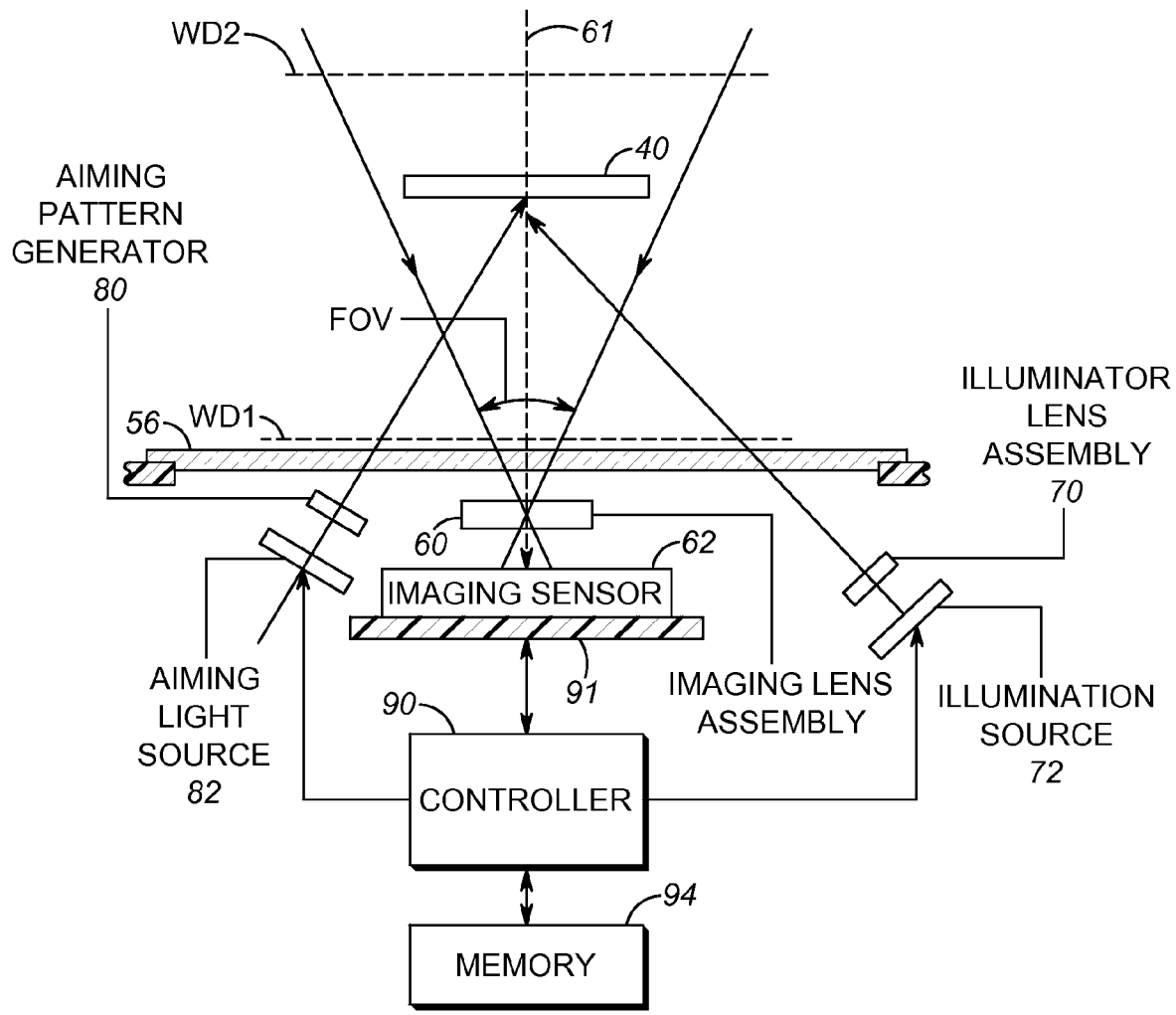
FIG. 2 is a schematic of an imaging scanner in accordance with some embodiments.

FIG. 2 is a schematic of an imaging scanner 50 in accordance with some embodiments. The imaging scanner 50 in FIG. 2 includes the following components: (1) an imaging sensor 62 positioned behind an imaging lens arrangement 60; (2) an illuminating lens arrangement 70 positioned in front of an illumination source 72; (3) an aiming pattern generator 80 positioned in front of an aiming light source 82; and (4) a controller 90. In FIG. 2, the imaging lens arrangement 60, the illuminating lens arrangement 70, and the aiming pattern generator 80 are positioned behind the window 56. The imaging sensor 62 is mounted on a printed circuit board 91 in the imaging scanner.

The imaging sensor 62 can be a CCD or a CMOS imaging device. The imaging sensor 62 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns. The imaging sensor 62 is operative to detect light captured by an imaging lens arrangement 60 along an optical path or axis 61 through the window 56. Generally, the imaging sensor 62 and the imaging lens arrangement 60 are designed to operate together for capturing light scattered or reflected from a barcode 40 as pixel data over a two-dimensional imaging field of view (FOV).

The barcode 40 generally can be located anywhere in a working range of distances between a close-in working distance (WD1) and a far-out working distance (WD2). In one specific implementation, WD1 is in a close proximity to the window 56, and WD2 is about a couple of feet from the window 56. Some of the imaging scanners can include a range finding system for measuring the distance between the barcode 40 and the imaging lens arrangement 60. Some of the imaging scanners can include an auto-focus system to enable a barcode be more clearly imaged with the imaging sensor 62 based on the measured distance of this barcode. In some implementations of the auto-focus system, the focus length of the imaging lens arrangement 60 is adjusted based on the measured distance of the barcode. In some other implementations of the auto-focus system, the distance between the imaging lens arrangement 60 and the imaging sensor 62 is adjusted based on the measured distance of the barcode.

In FIG. 2, the illuminating lens arrangement 70 and the illumination source 72 are designed to operate together for generating an illuminating light towards the barcode 40 during an illumination time period. The illumination source 72 can include one or more light emitting diodes (LED). The illumination source 72 can also include a laser or other kind of light sources. The aiming pattern generator 80 and the aiming light source 82 are designed to operate together for generating a visible aiming light pattern towards the barcode 40. Such aiming pattern can be used by the operator to accurately aim the imaging scanner at the barcode. The aiming light source 82 can include one or more light emitting diodes (LED). The aiming light source 82 can also include a laser, LED, or other kind of light sources.

In FIG. 2, the controller 90, such as a microprocessor, is operatively connected to the imaging sensor 62, the illumination source 72, and the aiming light source 82 for controlling the operation of these components. The controller 90 can also be used to control other devices in the imaging scanner. The imaging scanner 50 includes a memory 94 that can be accessible by the controller 90 for storing and retrieving data. In many embodiments, the controller 90 also includes a decoder for decoding one or more barcodes that are within the imaging field of view (FOV) of the imaging scanner 50. In some implementations, the barcode 40 can be decoded by digitally processing a captured image of the barcode with a microprocessor.

Barcode imaging scanners typically project a bright aiming pattern (e.g., a dot, line, cross pattern, etc.) to assist the user in aiming the scanner towards the barcode. When aimed properly, the aiming pattern will be projected onto the desired barcode.

In operation, in accordance with some embodiments, the controller 90 sends a command signal to energize the illumination source 72 for a predetermined illumination time period. The controller 90 then exposes the imaging sensor 62 to capture an image of the barcode 40. The captured image of the barcode 40 is transferred to the controller 90 as pixel data. Such pixel data is digitally processed by the decoder in the controller 90 to decode the barcode. The information obtained from decoding the barcode 40 is then stored in the memory 94 or sent to other devices for further processing.

For an Image-Based Barcode Scanner, the distance knowledge is important to configure the system parameters such as sensor exposure time, sensor gain, illumination pulse width, etc, for optimal barcode reading performance. In addition, for easy use an image-based barcode scanner typically requires an aiming system providing a visible aiming pattern to indicate where the imaging field of view (FOV) is. This disclosure proposes a single design which provides the visible aiming pattern within the desired reading range and in the meantime the shape of the aiming pattern changes from the near distance to the far distance such that the distance information can be derived from the aiming pattern shape.

One known approach for distance sensing is to add a dedicated source and sensor pair and derive the distance information from the returned signal strength. The problem with this approach is that the returned signal strength is dependent on not only the distance but also many other factors such as object reflectivity and object orientation etc. Therefore it is very challenging to separate these factors to reliably determine the distance. Moreover, additional source and sensor add cost and increase the system complexity. What is disclosed in the present disclosure is a single optical design which provides the visible aiming pattern within the desired reading range and in the meantime the aiming pattern shape changes from the near distance to the far distance for distance sensing.

Figure 3:
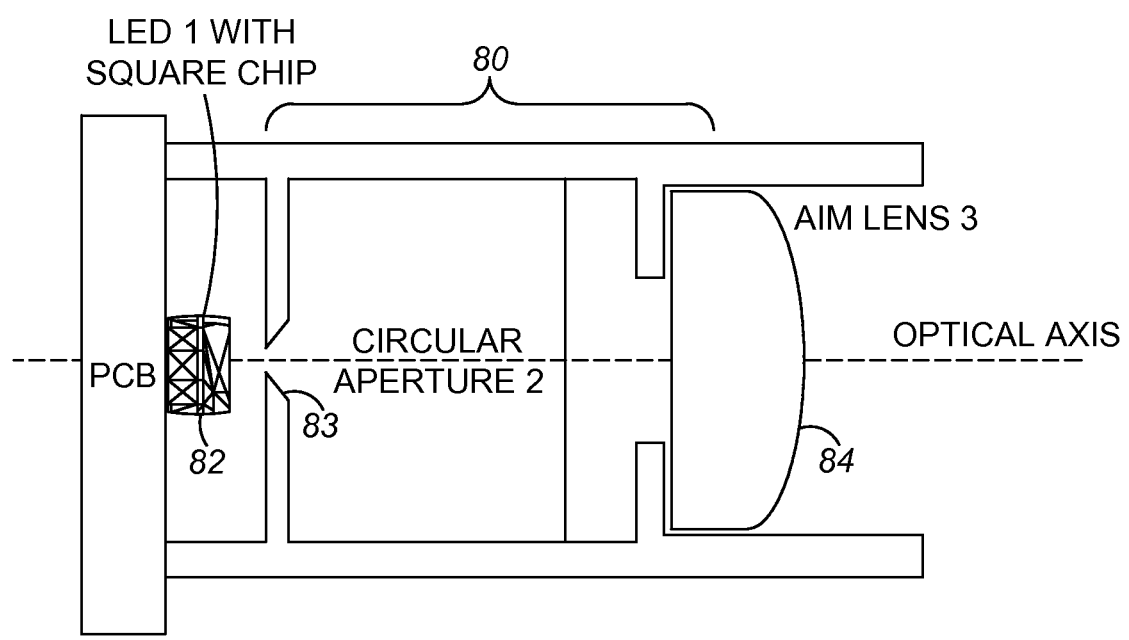
FIG. 3 is a schematic showing an optical system for generating the aiming pattern in accordance with one embodiment.
Figure 4:
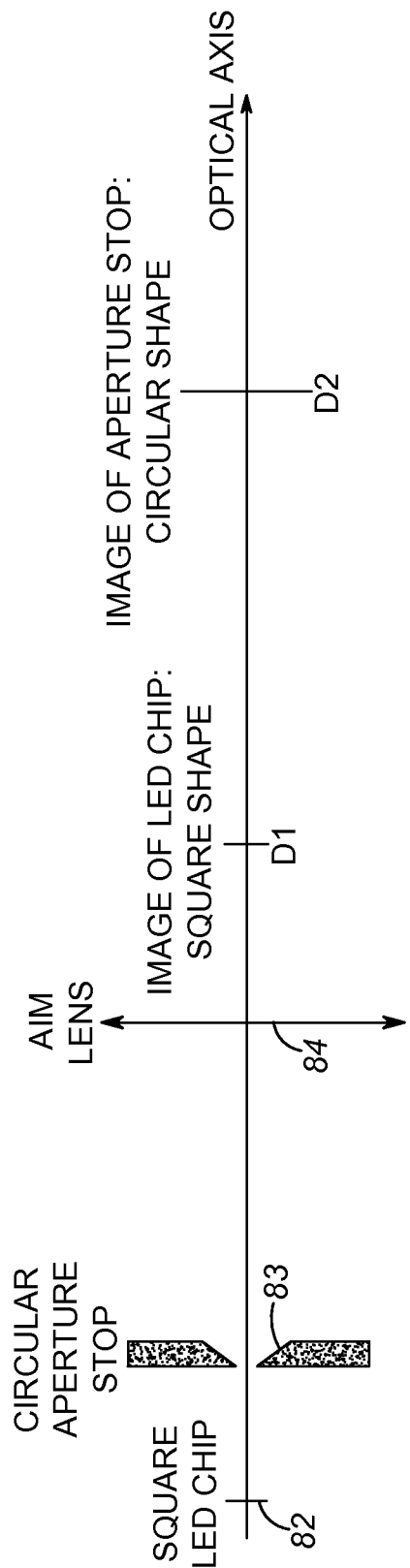
FIG. 4 is an optical system for generating the aiming pattern with its shape changing with the distance in accordance with one embodiment.
Figure 5A:
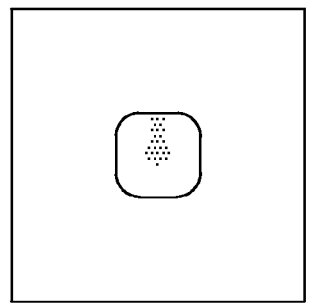
FIGS. 5A-5D are the aiming patterns at four different distances in accordance with one embodiment.
Figure 5B:
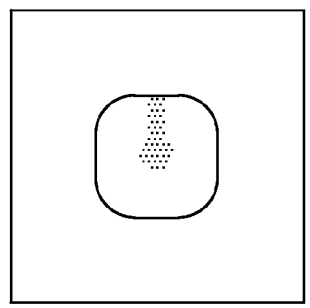
Figure 5C:
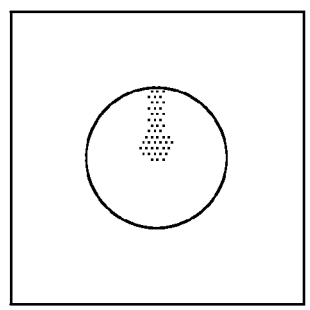
Figure 5D:
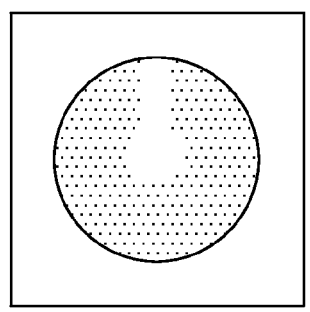

FIG. 3 is a schematic showing an optical system for generating the aiming pattern in accordance with one embodiment. The optical system includes an aiming LED 82, an aperture stop 83, and an aim lens 84. In one implementation, the aiming LED 82 is a square chip forming an area light source with the shape of square. The aperture stop 83 and an aim lens 84 belong to the pattern generating generator 80. The aim lens 84 projects the image of the square LED chip 82 at the distance D1 and the aim lens 84 also images the circular aperture stop 83 at the distance D2. Therefore, this single system provides the visible aiming patterns at different distances for indicating the image FOV. In the meantime, as shown in FIG. 4, the aiming pattern shape changes with the distance: in the proximity of the distance D1, the aiming pattern has the shape of the square LED chip; from the proximity of the distance D2 to the end of the reading range, the aiming pattern has the shape of the circular aperture stop. From the distance D1 to the distance D2, the aiming shape changes from the square shape to the circular shape. From this prior knowledge of the aiming pattern shape at different distances, the distance information can be easily and quickly obtained to configure the system parameters for the optimal barcode reading performance.

In one specific implementation, as shown in FIG. 3, aiming LED 82 is OSRAM LO E67F which has a square chip. The circular aperture stop 83 is placed at 0.2 mm from the LED top and has a diameter of 0.4 mm. The aim lens 84 is a planar-convex lens with an effective focal length (EFL) of 8.8 mm. Alternatively, both surfaces of the aim lens can be aspheric to minimize the off-axis aberrations and thus maximize sharpness of the aiming spot. The spacing between the aperture stop 83 and the aim lens 84 is 6.8 mm.

FIGS. 5A-5D are the aiming patterns at the distances of 101.6 mm (i.e., 4 inches), 152.4 mm (i.e., 6 inches), 203.2 mm (i.e., 8 inches) and 254.0 mm (i e 10, inches) respectively, which clearly shows that the aim patterns are square at the near distances 101.6 mm and 152.4 mm and circular at the far distance 203.2 mm and 254.0 mm. Therefore one can configure the short sensor exposure time, low sensor gain and/or short illumination pulse width to avoid the barcode image saturation when detecting the square aiming pattern. On the other hand one can configure the long sensor exposure time, high sensor gain and/or long illumination pulse width to increase the barcode image brightness when detecting the circular aiming pattern. This way the barcode image always has the optimal brightness for aggressive decoding. Additionally, when variable focus lens is used for the imaging lens arrangement 60, the variable focus lens can have its best focus set at a predetermined focus length based on the distance that is determined from the aiming patterns.

Figure 6:
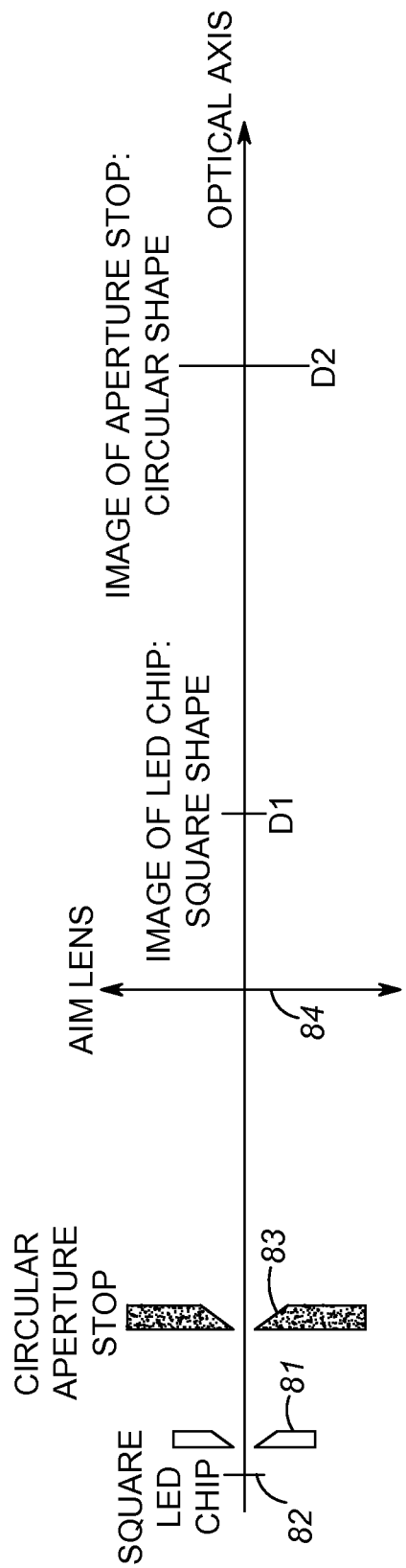
FIG. 6 is another optical system for generating the aiming pattern with its shape changing with the distance in accordance with one embodiment.

In other implementations, the aperture stop shape does not have to be limited to be circular. It could be any shape different from the LED chip shape, such as cross, elliptical, track etc. Depending on the applications, the distances where the aiming pattern changes its shape can be adjusted through changing the spacing between the aperture stop and the aim lens, the EFL of the aim lens, and/or the distance between the LED and the aperture stop. An additional field lens can be also added on the LED to help adjust the location of the LED chip image. In addition, as shown in FIG. 6, another aperture stop 81 can be positioned in close proximity of aiming LED 82 to function as a light source opening for defining more clearly an effective surface shape of the aiming light source.

The disclosed embodiment of combining the aiming and distance sensing functionalities into a single design can have the advantage of saving the system cost and complexity. Moreover, the shape of the aiming pattern offers a much more reliable way for distance sensing compared to the existing approach relying on the returned signal strength.

In general, the imaging scanner 50 includes a shape defining element 83, an aiming lens arrangement 84, and an aiming light source 82 configured to emit visible light through both the shape defining element 83 and the aiming lens arrangement 84 to generate an aiming pattern on a target object. The shape of the aiming pattern changes with a distance characterizing the separation between the target object 40 and the imaging scanner 50 at least between a first distance D1 and a second distance D2. Here, the aiming pattern at the first distance D1 and the aiming pattern at the second distance D2 have substantially different geometric shapes that are not similar to each other and are not congruent under any uniform scaling transformation.

The imaging scanner 50 further includes an illumination source 72, an imaging lens arrangement 60, an imaging sensor 62 having photosensitive elements, and a controller 90. The imaging sensor 62 is configured for detecting light from the target object 40 through the imaging lens arrangement 60 to create first pixel data during a first time period when the aiming pattern is projected on the target object. The controller 90 is configured to process the first pixel data for determining the distance characterizing the separation between the target object and the apparatus. For determining the distance, the shape of the aiming pattern in the first pixel data is compared with the expected shape of aiming patterns at multiple distances. In one implementation, for determining the distance, the boundary of the shape of the aiming pattern in the first pixel data is compared with the boundary of the expected shape of aiming patterns at multiple distances. In another implementation, for determining the distance, the two-dimensional image of the shape of the aiming pattern in the first pixel data is compared with the two-dimensional image of the expected shape of aiming patterns at multiple distances. Images of the aiming pattern at multiple distances can be stored in the memory 94.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
   a shape defining element;
   an aiming lens arrangement;
   an aiming light source configured to emit visible light through both the shape defining element and the aiming lens arrangement to generate an aiming pattern on a target object, wherein a shape of the aiming pattern changes with a distance characterizing a separation between the target object and the apparatus at least between a first distance and a second distance, and wherein the aiming pattern at the first distance and the aiming pattern at the second distance have substantially different geometric shapes that are not similar to each other and are not congruent under any uniform scaling transformation;

an illumination source operative to generate an illumination light emitted towards a barcode on the target object;

an imaging lens arrangement;

an imaging sensor having photosensitive elements for detecting light from the target object through the imaging lens arrangement to create first pixel data during a first time period when the aiming pattern is projected on the target object, and for detecting light from the barcode through the imaging lens arrangement to create second pixel data during a second time period when the barcode is illuminated by the illumination light; and a controller configured to process the first pixel data for determining the distance characterizing the separation between the target object and the apparatus, wherein said determining the distance comprises comparing the shape of the aiming pattern in the first pixel data with an expected shape of aiming patterns at multiple distances.

2. The apparatus of claim 1, wherein the controller is further configured for processing the second pixel data to decode an image of the barcode.

3. The apparatus of claim 1, wherein said comparing comprises comparing a boundary of the shape of the aiming pattern in the first pixel data with the boundary of the expected shape of aiming patterns at multiple distances.

4. The apparatus of claim 1, wherein said comparing comprises comparing a two-dimensional image of the shape of the aiming pattern in the first pixel data with a two-dimensional image of the expected shape of aiming patterns at multiple distances.

5. The apparatus of claim 1, wherein the shape defining element is positioned between the aiming light source and the aiming lens arrangement.

6. The apparatus of claim 1, wherein the shape defining element is an aperture.

7. The apparatus of claim 1, wherein the aiming light source is a light emitting diode (LED).

8. The apparatus of claim 1, further comprising:
a light source opening positioned in close proximity of the aiming light source to define an effective surface shape of the aiming light source.

9. The apparatus of claim 1, further comprising:
a memory storing images of the aiming pattern at multiple distances.

10. The apparatus of claim 1, wherein the distance characterizing the separation between the target object and the apparatus is the distance between the target object and the apparatus.

11. A method comprising:
projecting visible light through both a shape defining element and an aiming lens arrangement to generate an aiming pattern on a target object, wherein a shape of the aiming pattern changes with a distance characterizing a separation between the target object and the aiming lens arrangement at least between a first distance and a second distance, and wherein the aiming pattern at the first distance and the aiming pattern at the second distance have substantially different geometric shapes that are not similar to each other and are not congruent under any uniform scaling transformation;

detecting light from the target object through an imaging lens arrangement with an imaging sensor having photosensitive elements to create first pixel data during a first time period when the aiming pattern is projected on the target object;

processing the first pixel data for determining the distance characterizing the separation between the target object and the aiming lens arrangement, wherein said determining the distance comprises comparing the shape of the aiming pattern in the first pixel data with an expected shape of aiming patterns at multiple distances;

projecting an illumination light towards a barcode on the target object; and detecting light from the barcode through the imaging lens arrangement with the imaging sensor to create second pixel data during a second time period when the barcode is illuminated by the illumination light and the imaging lens arrangement with variable focuses is set at a predetermined focus length as determined from the distance characterizing the separation between the target object and the aiming lens arrangement.

12. The method of claim 11, further comprising:
processing the second pixel data to decode an image of the barcode.

13. A method comprising:
projecting visible light through both a shape defining element and an aiming lens arrangement to generate an aiming pattern on a target object, wherein a shape of the aiming pattern changes with a distance characterizing a separation between the target object and the aiming lens arrangement at least between a first distance and a second distance, and wherein the aiming pattern at the first distance and the aiming pattern at the second distance have substantially different geometric shapes that are not similar to each other and are not congruent under any uniform scaling transformation;

detecting light from the target object through an imaging lens arrangement with an imaging sensor having photosensitive elements to create first pixel data during a first time period when the aiming pattern is projected on the target object;

processing the first pixel data for determining the distance characterizing the separation between the target object and the aiming lens arrangement, wherein said determining the distance comprises comparing the shape of the aiming pattern in the first pixel data with an expected shape of aiming patterns at multiple distances;

projecting an illumination light towards a barcode on the target object; and detecting light from the barcode through the imaging lens arrangement with the imaging sensor to create second pixel data during a second time period when the barcode is illuminated by the illumination light.

14. The method of claim 13, further comprising:
processing the second pixel data to decode an image of the barcode.

15. The method of claim 13, wherein said comparing comprises comparing the boundary of the shape of the aiming pattern in the first pixel data with a boundary of the expected shape of aiming patterns at multiple distances.

16. The method of claim 13, wherein said comparing comprises comparing a two-dimensional image of the shape of the aiming pattern in the first pixel data with a two-dimensional image of the expected shape of aiming patterns at multiple distances.

17. The method of claim 13, wherein said projecting visible light comprises generating visible light with an aiming light source including a light emitting diode (LED).

18. The method of claim 13, further comprising:
a light source opening positioned in close proximity of an aiming light source to define an effective surface shape of the aiming light source.

19. The method of claim 13, further comprising:
storing in a memory images of the aiming pattern at multiple distances.

20. The method of claim 13, wherein the distance characterizing the separation between the target object and the aiming lens arrangement is the distance between the target object and the aiming lens arrangement.

* * * * *